Nov. 28, 1967     MASAO SUGAYA     3,354,919
SCREWDRIVER WITH SCREW HOLDING MEANS
Filed June 8, 1965     4 Sheets-Sheet 1
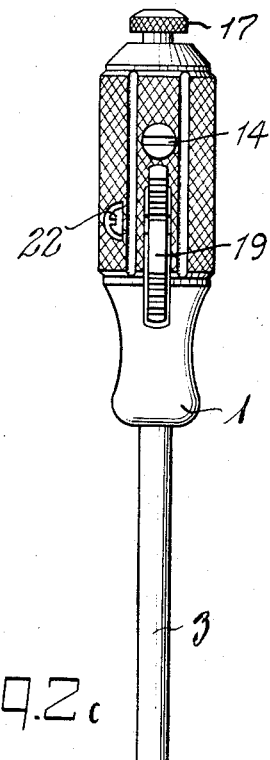
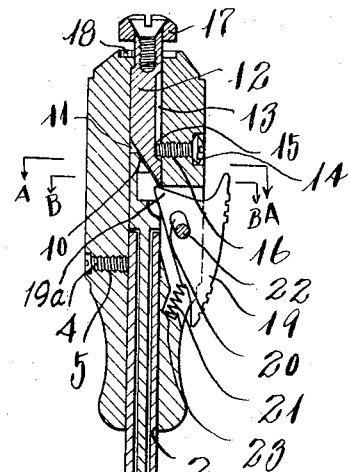
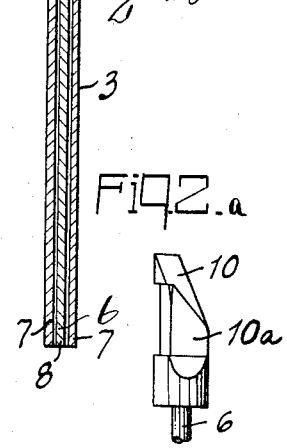
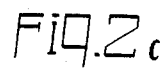
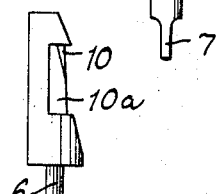
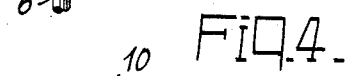
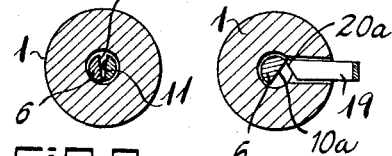
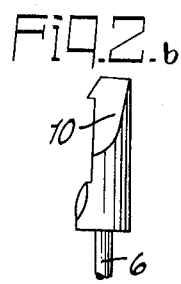
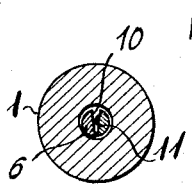
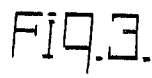
INVENTOR
MASAO SUGAYA
BY Strauch, Nolan, Neale, Nies and Bronaugh
ATTORNEYS Nov. 28, 1967   MASAO SUGAYA   3,354,919
SCREWDRIVER WITH SCREW HOLDING MEANS
Filed June 8, 1965   4 Sheets-Sheet 2

INVENTOR
MASAO SUGAYA
BY
Strauch, Nolan, Neale, Nies and Bronaugh
ATTORNEYS

Nov. 28, 1967  MASAO SUGAYA  3,354,919
SCREWDRIVER WITH SCREW HOLDING MEANS
Filed June 8, 1965  4 Sheets-Sheet 3
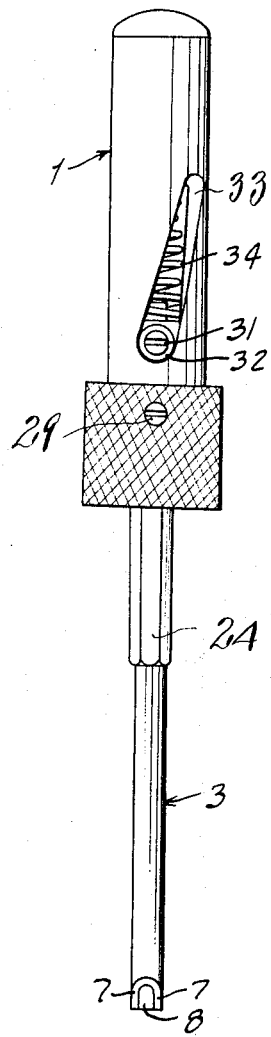
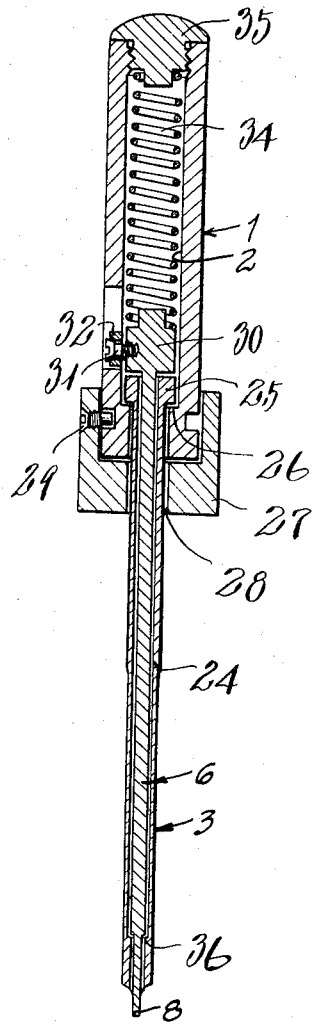
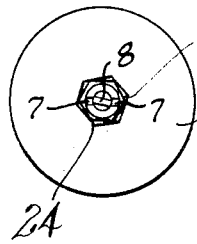
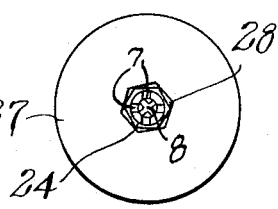
INVENTOR
MASAO SUGAYA
BY Strauch, Nolan, Neale, Nies and Bronaugh
ATTORNEYS 3,354,919
SCREWDRIVER WITH SCREW HOLDING MEANS
Masao Sugaya, 1870 4-chome, Higashi Komatsugawa-cho, Edogawa-ku, Tokyo, Japan
Filed June 8, 1965, Ser. No. 462,206
5 Claims. (Cl. 145—50)

This invention is concerned with a screwdriver.

Heretofore, in order to facilitate effecting a screwing or unscrewing operation with a screwdriver the diverse screwdrivers have been proposed under the same object to engage and attach a screw at its screw slot with a blade portion of the screwdriver. For example, in one of the known screwdrivers a blade portion is formed of a magnetic material although it may be followed by such the defect that it is not applicable to a nonmagnetic screw for example such as a brass screw.

This invention is to obviate the above disadvantage and relates to a novel screwdriver of the type indicated.

Another object is to provide such a screwdriver which has certain structural and functional features of advantage over the similar screwdrivers of the prior art.

A further object is to provide such a screwdriver which comprises a grip means, a sleeve shank means operatively associated with said grip means, a rotary mandrel means which is rotatably arranged in said sleeve shank means wherein the sleeve shank means at its exposed extremity is provided with not less than two outer blades means while the rotary mandrel at its extremity adjacent the exposed extremity of the sleeve shank means is provided with a center blade means and at its other extremity is provided with means selectively actuated by the user to rotate the rotary mandrel means relative to the sleeve shank means to grippingly engage their respective blade means with a screw to be driven.

Still another object is to provide a novel screwdriver which comprises a grip means, a sleeve shank means slideably operatively associated with said grip means, a rotary mandrel which is rotatably arranged in said sleeve shank means wherein the sleeve shank means at its exposed extremity is provided with not less than two outer blades means while the rotary mandrel at its extremity adjacent the exposed extremity of the sleeve shank means is provided with a center blade means and at its other extremity is provided with means selectively actuated by the user to rotate the rotary mandrel means relative to the sleeve shank means to grippingly engage their respective blade means with a screw to be driven.

These and other objects and advantages of this invention will be more fully understood from the following description of three preferred forms of the invention by way of example in the accompanying drawings in which:

FIGURE 1 is a front elevation of a screwdriver according to the invention;

FIGURE 2 is a longitudinally sectioned lateral view of FIGURE 1;

FIGURE 2a is fragmentarily enlarged front elevation of a cam portion of a rotary mandrel according to the invention;

FIGURE 2b is a right side view of FIGURE 2a;

FIGURE 2c is a left side view of FIGURE 2a;

FIGURE 3 is a cross section view taken along the line A—A in FIGURE 2;

FIGURE 4 is a cross section view taken approximately on the line B—B in FIGURE 2;

FIGURE 11 is a front elevation of a screwdriver provided with a locking device according to the invention;

FIGURE 12 is a longitudinal sectioned lateral view of FIGURE 11;

FIGURE 13 is a bottom view of FIGURE 11 showing the states that a hexagonal portion of the sleeve shank at its corners is rigidily engaged with an inner wall of a hexagonal bore provided in the locking device and that the flat center blade portion is somewhat turned;

FIGURE 14 is a bottom view similar to FIGURE 13 showing the state that the cross center blade portion is somewhat turned;

FIGURE 15 is a front elevation of a screwdriver of another embodiment according to the invention;

FIGURE 16 is a longitudinally sectioned lateral view of FIGURE 15; and

FIGURE 17 is a bottom view of FIGURE 15.

Figure 5:
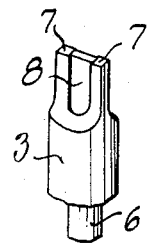
FIGURE 5 is a fragmentarily enlarged perspective view of the flat blade portion of the screwdriver according to the invention.

As illustrated by way of example in the drawings, the screwdriver in accordance with the invention comprises a grip provided with a central bore and a push member, a sleeve shank portion operatively associated with the said grip, a rotary mandrel which is rotatably arranged in said shank portion wherein the sleeve shank portion at its exposed extremity is provided with not less than two outer blades while the mandrel at its extremity adjacent the exposed extremity of the sleeve shank means is provided with a center blade and at its other extremity is provided with means selectively actuated by the user to rotate the rotary mandrel means relative to the sleeve shank means to grippingly engage their respective blade means with a screw to be driven.

Figure 6:
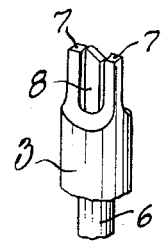
FIGURE 6 is a fragmentarily enlarged perspective view of the flat blade portion of the screwdriver according to the invention showing the state that a center blade is somewhat turned.
Figure 7:
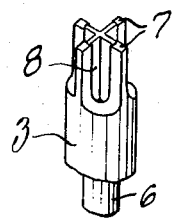
FIGURE 7 is a fragmentarily enlarged perspective view of a cross blade portion of the screwdriver according to the invention.
Figure 8:
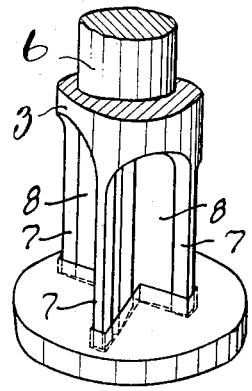
FIGURE 8 is a fragmentarily enlarged perspective view of the cross blade portion of the screwdriver showing the state that it is inserted in a cross screw slot.
Figure 10:
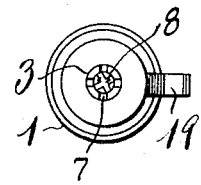
FIGURE 10 is a bottom view similar to FIGURE 9 showing the state that the cross center blade is somewhat turned.

In FIGURES 1 to 6, the reference numeral 1 designates a grip of the screwdriver provided with a center bore 2 into which one end of a sleeve shank 3 is inserted and fastened by screws 4 through tapped bores 5 provided around the grip 1. The sleeve shank at the other end is provided with two outer blades 7 of a flat shape which is adapted to be fitted to the screw slot and screw in or unscrew the threaded screws. In the sleeve shank 3 is rotatably arranged a rotary mandrel 6 having at its extremity a center blade 8 adapted to be fitted to the screw slot together with the outer blades and attach the screw thereto upon the rotation of the rotary mandrel by a cam mechanism illustrated below. Preferably the center blade 8 is of somewhat smaller thickness than the outer blades 7 so that the former turns positively as shown in FIGURE 6. Alternately, the outer blades 7 and the center blade 8 may be constituted in the cross form as shown in FIGURE 7 so that it may be fitted to a cross screw slot as shown in FIGURES 8 and 10. The other end of the mandrel 6 inserted in the center bore 2 of the grip 1 is provided with an axially and angularly (see FIGURES 2a, 2b and 2c) inclined end surface 10 adapted to be drivingly engaged by a corresponding inclined end surface 11 of a push bolt 12 which is slideably but not rotatably disposed in the upper half of the center bore 2 of the grip 1. The push bolt 12 at its one side is provided with a slot 13 into which a tip 15 of a screw 14 is inserted through a tapped bore 16 provided in the grip 1 so that the push bolt 12 may slide vertically along the said tip 15 of the screw 14 without rotation of the bolt.

Further, the push bolt 12 at its head portion is provided with a ring 17 which may be fitted to a circular space 18 formed in a top portion of the grip 1 when the push bolt 12 is pushed downwardly.

Provided beneath the tapped bore 16 is a compression mechanism for the push bolt 12 which comprises a push button 19 having an elliptical bore 20 and arranged in a recess 21 provided below the tapped bore 16, with its nose 19a (FIGURES 2 and 4) in an axially extending recess in mandrel 6 for supportingly engaging the tip end of push bolt 12 and drivingly engaging the slant wall 10a (FIGURES 2a, 2c and 4) of the axial recess. A screw pin 22 screwed in the grip across said recess 21 supports the push button 19 and a compression spring 23 adapted to press the push button upwardly yieldingly biases push bolt 12 to its normal upper position and mandrel 6 to its normal home position (FIGURE 5) aligned with blades 7.

Figure 9:
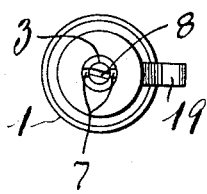
FIGURE 9 is a bottom view of FIGURE 1 showing the state that the flat center blade portion is somewhat turned.

In the operation of the screwdriver, the blade portions of the screwdriver are fitted to the screw slot of the screw and then the push bolt 12 is pushed downwardly to engage the inclined end surface 11 with the cooperating inclined end surface 10 of mandrel 6 (FIGURE 3) and through the opposing angular inclinations of end surfaces 10 and 11, to force the freely rotatable mandrel 6 to rotate as axial movement of push bolt 12 is continued by the resulting lateral camming force of the cam mechanism. Upon the rotation of the mandrel 6, the center blade 8 is turned relative to blades 7 as shown in FIGURES 6 and 9 so that each side edge of the center blade particularly its corner portion engages one or both inner walls of the screw slot to wedge blades 7 and 8 in the screw slot and grippingly hold a screw to be driven. In this connection, the push button 19 is also pushed downwardly by the lower extremity of the push bolt 12 and the spring 23 is compressed accordingly.

To keep the center blade in the turned gripping position the push button 19 is held in its downward position by the user's finger and when released the push button is pushed upwardly and inwardly of its recess 21 by the spring action thereby elevating the push button 12 and simultaneously camming the rotary mandrel 6 to return the center blade to its original home position parallel to the outer blades.

A second embodiment of the invention is illustrated in FIGURES 11, 12, 13 and 14 where the sleeve shank 3 is provided with a polygonal base portion 24 having a flanged bead 25 to be held by an inner stage 26 formed in the lower portion of the grip 1.

A locking means comprises a cup-shaped member 27 of somewhat greater inner diameter than the outer diameter of the grip 1 and provided at its bottom with a lower bore 28 of a polygonal shape corresponding to the polygonal base of the sleeve shank 1 but of somewhat larger size than the latter.

The cup-shaped member 27 rotatably encompasses around the lower portion of the grip 1 by means of a supporting pin 29 screwed from a point of circumferential wall of the cup-shaped member 27 into an annular groove provided around a lower periphery of the grip 1.

A rotary mandrel 6 has at its upper end a head member 30.

A journal screw pin 31 with a washer 32 is screwed into the head member 30 of the mandrel 6 so that it slides along a slanted slot 33 provided in the side wall of the grip to effect rotation of rotary mandrel 6 with the center blade 8 in a manner to be presently pointed out. On the head member 30 in the center bore 2 of the grip is arranged a compression spring 34 and an upper open end of the grip is sealed by a threaded spring abutment cap 35.

The operation of the screwdriver shown in FIGURES 11 to 14 may be effected in such a way that upon fitting the blades of the screwdriver to the screw slot the grip 1 is pressed downwardly causing pin 31 together with mandrel 6 and sleeve shank 3 to slide upwardly relative to grip 1 and member 27 and pin 31 to travel along the slanted slot 33 rotating the head member 30 with the rotary mandrel 6 relative to sleeve shank 2 restrained against rotation by its engagement in the screw slot so that the center blade 8 grippingly holds the screw fast as already illustrated in connection with FIGURES 6, 9 and 10. To maintain the holding state of the center blade, the locking member 27 is manually turned whereby an inner wall of the lower bore 28 will be tightly engaged with the sharp points of the polygonal base portion of the sleeve shank 3 so that the shank 3 and the mandrel 6 are held locked against relative reverse rotation under the influence of the compressed spring 34. In this connection the mandrel 6 is supported at the stage 36 provided in the lower portion of the sleeve shank 3, move upwardly into bore 2 of grip 1. When the locking member 27 is released so as to correlate the polygonal inner wall of the lower bore 28 with the polygonal base portion of the sleeve shank, head member 30 of the mandrel 6 is pushed downwardly by the spring action and simultaneously the pin 31 slides downwardly thereby returning the center blade 8 into the original state parallel to the outer blades 7.

A third embodiment of the invention is illustrated in FIGS. 15 to 17 where a locking cylinder 37 is fastened at its lower portion to the sleeve shank by a screw 38 while provided at its upper portion with a chamber 39 of a polygonal shape adapted to slide vertically on an extension 40 of the grip 1 made in the corresponding polygonal form. Preferably an inner diameter of the chamber 39 is only slightly greater than the outer diameter of the extension 40 to form a close sliding fit as shown in FIGURE 16.

The operation of the embodiment shown in FIGS. 15 to 17 is similar to that of the second embodiment shown in FIGS. 11 to 14. When the grip 1 is pressed downwardly the pin 31 slides upwardly along the slanted slot 33 rotating the head member 30 with the mandrel 6 thereby to turn the center blade 8 to hold the screw fast. The cylinder 37 slides upwardly on the extension 40 of the grip which is turned manually to make a rigid locked engagement therebetween to resist relative movement of the sleeve shank 3 relative to mandrel 6 under influence of spring 34 and keep the center blade 8 in the turned state holding the screw. When the engagement is manually released, the sleeve shank with the mandrel under influence of the spring action move axially relative to grip 1 and cylinder 37 to return bead 25 and head 30 to stage 26 and the center blade to its original state parallel to the outer blades.

It will thus be seen that the screwdriver in accordance with the invention provides a positive holding of the screw free from the nature of the material forming the screw thereby facilitating the screwing or unscrewing operation conveniently. Moreover, since the structure is relatively simple, the screwdriver in accordance with the invention may be manufactured at a low cost.

While three preferred embodiments of the invention have been illustrated by way of example in the drawings and particularly described, it will be understood that modifications may be made in the construction and that the invention is in no way limited to the embodiments shown.

What I claim is:

1. A screwdriver comprising grip means; a sleeve shank means operatively fastened to said grip means and formed at its end remote from said grip means with not less than two radially outwardly disposed blade means; a rotary mandrel means rotatively arranged in said sleeve shank means and provided within said remote end of said sleeve shank means with a center blade means; and means associated with said grip means and rotary mandrel means selectively actuatable by the user for rotatably driving said rotary mandrel means relative to said sleeve shank means to grippingly engage the respective blade means with a screw to be driven, the said sleeve shank means and grip means being slidably connected and respectively formed with an enlarged flanged bead and an inwardly directed cooperating abutment stage to prevent disassembly in one direction, said rotary mandrel means being slidably and rotatably received in said sleeve shank means and formed with an enlarged head member having a tapped opening in its side wall carrying a cam follower pin and washer assembly, said grip means in the area of said enlarged head member being provided with a slanted generally axially directed slot slidingly receiving said washer of said cam follower pin and washer assembly for rotatably driving said mandrel means when said grip means is moved axially relative to said mandrel means, and jam locking means interposed between said grip means and said sleeve shank means for selective operation by the user to lock said grip means against relative movement with respect to said mandrel means when a screw is gripped by said blade means.

2. A screwdriver comprising a grip means including a center bore and axially slanted intersecting side opening recess; a sleeve shank means having a portion slidably operatively fastened in the center bore of said grip means and formed at its end remote from said grip means with not less than two radially outwardly disposed blade means; a rotary mandrel means rotatably arranged in said sleeve shank means with an end protruding into the bore of said grip means and provided within said remote end of said sleeve shank means with a center blade means; means associated with said grip means and rotary mandrel means selectively actuatable by the user for rotatably driving said rotary mandrel means relative to said sleeve shank means to grippingly engage the respective blade means with a screw to be driven, said associated means comprising a pin mounted in said portion of said rotary mandrel means and extending into said intersecting side opening recess and arranged to have driving engagement with the wall of said intersecting side opening recess for imparting gripping rotation to said mandrel means when said grip means is moved axially in one direction by the user; spring drive mechanism for returning said mandrel means to its home position when said grip means is released by the user comprising a spring seat on said protruding end of said rotary mandrel means, a compression spring extending from said seat along said center bore, and an end cap on said grip means engaging the other end of said compression spring; and a locking device rotatably mounted at the lower end of said grip means and having a wall portion encircling said sleeve shank means adapted when selectively manually rotated by the user to bindingly engage said sleeve shank means to lock said mandrel means in gripping position.

3. A screwdriver according to claim 2 wherein said sleeve shank means is provided with a polygonal portion within the encircling wall portion of said locking device and said encircling wall portion of said locking device is polygonal and sufficiently large to permit appreciable relative rotation whereby locking is effected by rotating said locking device with respect to said sleeve shank means to frictionally jam the polygonal wall section and polygonal portion of said sleeve shank means thereby locking said grip means, said sleeve shank means, and said mandrel means against relative axial movement under influence of said compression spring.

4. A screwdriver according to claim 2 wherein said center blade means is a flat blade of lesser thickness than said radially outwardly disposed blade means.

5. A screwdriver according to claim 2 wherein said radially outwardly disposed blade means comprise right angularly related pairs of blade means and said center blade means is a cross center blade the respective cross arms of which are of lesser thickness than said right angularly related pairs of blade means.

References Cited
UNITED STATES PATENTS 2,507,167   5/1950   Lemmerman _____ 145—61.4

FOREIGN PATENTS 487,343   10/1952   Canada.
598,834   5/1960   Canada.
197,371   8/1938   Switzerland.
297,517   6/1954   Switzerland.

OTHELL M. SIMPSON, *Primary Examiner.*

R. V. PARKER, *Assistant Examiner.*